Oct. 3, 1967  M. D. MERRITT  3,344,503
APPARATUS AND METHOD FOR MANUFACTURE OF BUILDING PANELS
Filed Dec. 12, 1963  3 Sheets-Sheet 1

INVENTOR.
MARVIN D. MERRITT
BY
Oberlin, Maky & Donnelly
ATTORNEYS

Oct. 3, 1967
M. D. MERRITT
3,344,503
APPARATUS AND METHOD FOR MANUFACTURE OF BUILDING PANELS
Filed Dec. 12, 1963
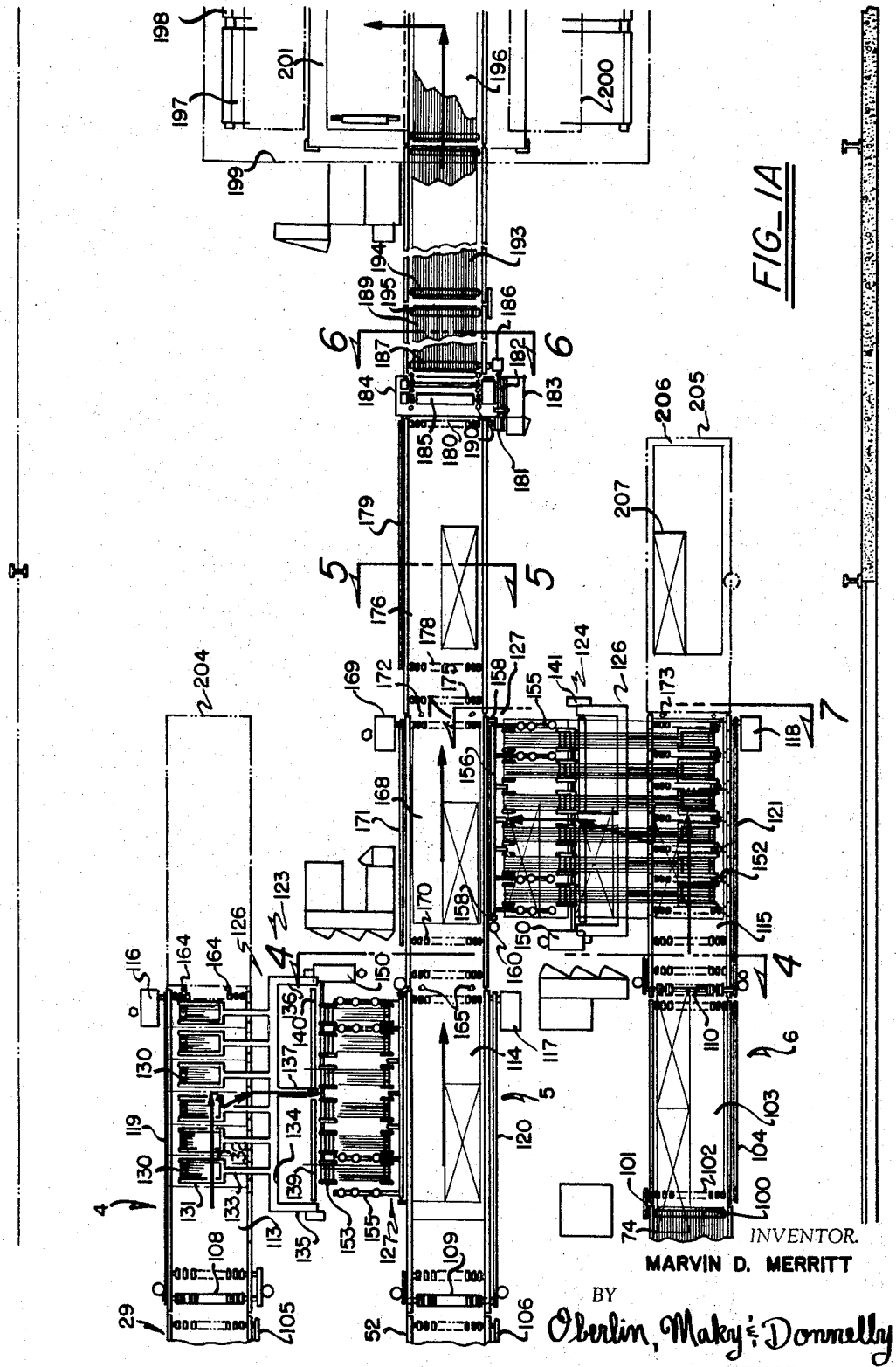
FIG_IA
INVENTOR.
MARVIN D. MERRITT
BY
Oberlin, Maky & Donnelly
ATTORNEYS Oct. 3, 1967   M. D. MERRITT   3,344,503
APPARATUS AND METHOD FOR MANUFACTURE OF BUILDING PANELS
Filed Dec. 12, 1963   3 Sheets-Sheet 3
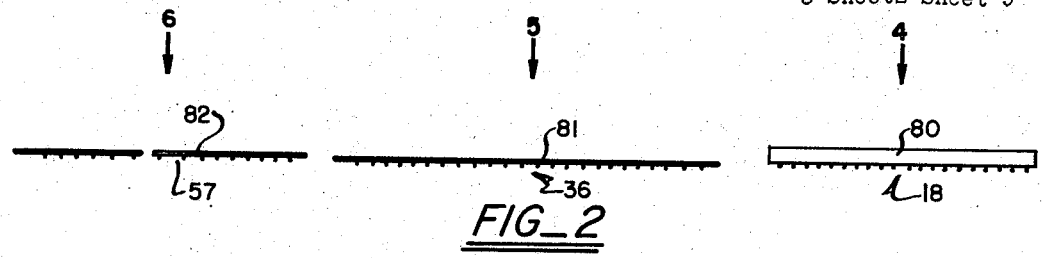
FIG_2
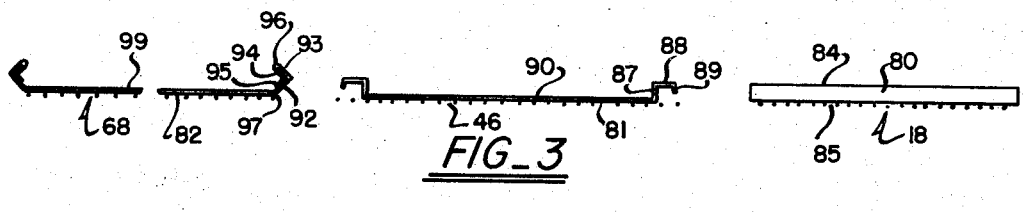
FIG_3
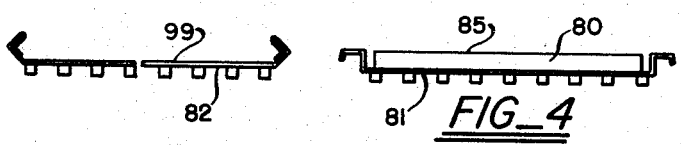
FIG_4
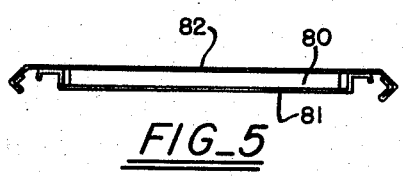
FIG_5
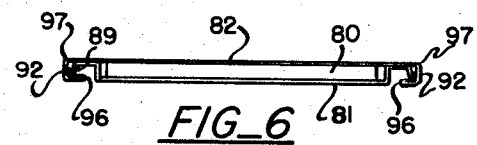
FIG_6
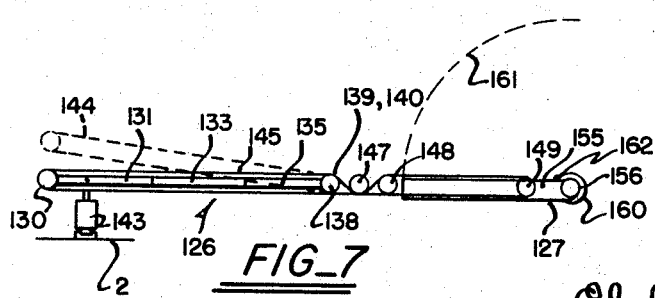
FIG_7
INVENTOR.
MARVIN D. MERRITT
BY
Oberlin, Maky & Donnelly
ATTORNEYS

United States Patent Office 3,344,503
Patented Oct. 3, 1967

3,344,503
APPARATUS AND METHOD FOR MANUFACTURE
OF BUILDING PANELS
Marvin D. Merritt, Streetsboro, Ohio, assignor to The
E. F. Hauserman Company, Cleveland, Ohio, a corporation of Ohio
Filed Dec. 12, 1963, Ser. No. 330,015
17 Claims. (Cl. 29—430)

This invention relates generally as indicated to apparatus and method for manufacture of building panels and more particularly to a production system for continuously rapidly producing relatively thin building panels comprised of relatively thin metallic facing plates with an insulating material therebetween.

Building panels, especially those used in reusable interior wall systems, are generally quite expensive to make and are usually produced with a substantial amount of labor specially formed and fitted for installation at the site of use in the manufacturing plant. Such panels require pre-engineering layout and cannot be cut down and fitted on the job.

However, in the copending application of John A. Bohnsack, entitled, "Reusable Wall System," filed Dec. 12, 1963, Ser. No. 330,017, there is disclosed a unique reusable wall system incorporating a building panel unit which is made of two sheets of steel totally enclosing an incombustible rigid core. To make the basic panel component of such reusable wall system as economically as possible, and yet to exact standards, the present apparatus and method has been devised. With such production system, it is possible to produce in a highly economical manner with completely automatic fabrication a building panel composed of impact resistant durable steel completely enclosing a gypsum or like core. With such production process, handling of the panel components and the completed panel is greatly facilitated and speedier delivery results. Moreover, it is possible to fabricate and ship such panels having a baked on prime coating which will in no way be damaged by the production line greatly facilitating the subsequent application of surface wall treatments such as woods, vinyls, or other covering materials.

It is accordingly a principal object of the present invention to provide a production line for the automatic fabrication of building panels.

A further principal object is the provision of a method producing rapidly a building panel which consists of durable impact resistant steel completely covering a gypsum or like core.

Another object is the provision of a production line for building panels utilizing a minimum of space and labor.

Still another object is the provision of a method and apparatus for the manufacture of building panels which will not in any way damage the exposed faces thereof permitting the same to be shipped with a prime coating.

A yet further object is the provision of apparatus and method for a production of building panels requiring a minimum of component inventory and permitting the completed panels to be shipped directly from the end of the production line.

Another object is the provision of apparatus and method for producing reusable building panels which do not require pre-engineering layout and which can be cut down and fitted on the job even for doors.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIGS. 1 and 1A are broken continuations of each other illustrating fragmentarily in top plan a production layout of the present invention;

FIG. 2 is a schematic section taken substantially on the line 2—2 of FIG. 1 illustrating the initial arrangement of the components of the building panel on the three conveyors of the apparatus disclosed;

FIG. 3 is a similar schematic section taken on the line 3—3 of FIG. 1;

FIG. 4 is a similar schematic section taken on the line 4—4 of FIG. 1A;

FIG. 5 is a similar schematic section taken on the line 5—5 of FIG. 1A;

FIG. 6 is a similar schematic section taken on the line 6—6 of FIG. 1A illustrating the finished product; and FIG. 7 is a schematic section taken substantially on the line 7—7 of FIG. 1A showing in end elevation the transfer and flip-over mechanism employed to place the components from the side conveyors onto the central conveyor.

Figure 1:
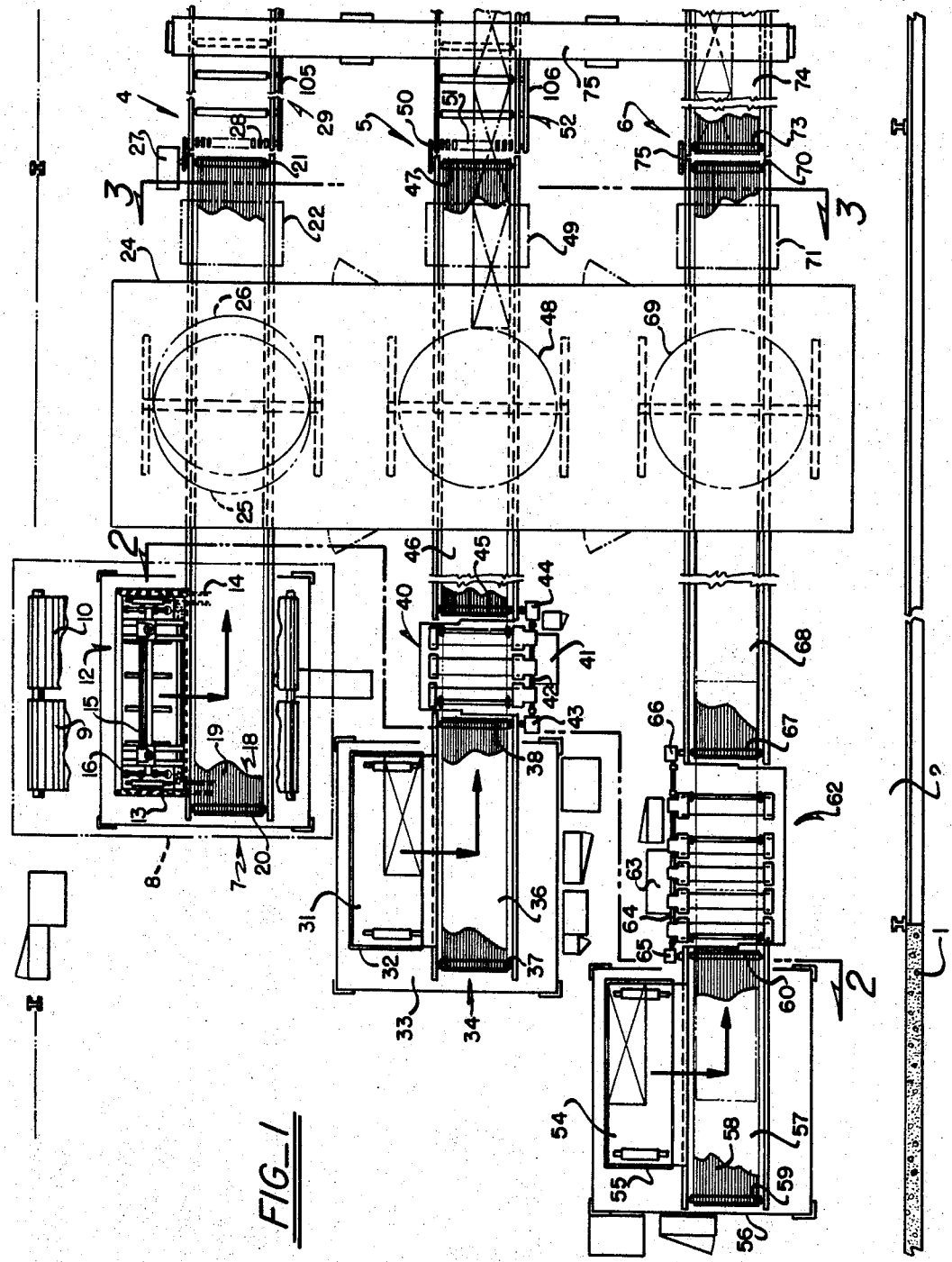

Referring now more particularly to FIGS. 1 and 1A and initially to FIG. 1, the apparatus of the present invention may be housed in a plant or other suitable building 1 on floor 2 and comprises three parallel laterally spaced conveyor lines 4, 5 and 6. Such conveyors are adapted to receive the three components of the building panel provided by the present invention. The conveyor 4 at its entry end 7 extends transversely of a pit 8 having slat conveyors 9 and 10 therein mounted for movement normal to the axis of conveyor line 4. Such pit 8 may be approximately 2 feet deep and the conveyors 9 and 10 are of such length that approximately two stacks of insulating panels or boards may be provided thereon. While it will be appreciated that insulating panels such as foamed rigid plastics, honeycombed structures, or other suitable insulating material panels may be provided, the illustrated embodiment of the present invention contemplates the use of gypsum boards and conveyor line 4 will hereinafter be referred to as the gypsum board line. Two stacks of such gypsum board having approximately 32 boards per stack may then be placed upon the conveyors 9 and 10.

An overhead elevator and transfer unit 12 mounted on rails 13 and 14 utilizing a frame 15 having suction tips 16 thereon may be employed to transfer the gypsum boards one at a time from the stack on the conveyors 9 and 10 nearest the conveyor line 4 onto such conveyor. Each gypsum board may be approximately ⅜ inch in thickness and may vary in length from a minimum of 84 inches to a maximum of 144 inches and in width from a minimum of 24 inches to a maximum of 48 inches.

The initial section of the gypsum board line 4 onto which the gypsum boards are deposited by the overhead elevator and transfer unit 12 comprises a string conveyor 18 which includes a plurality of parallel strands of nylon or like material cord 19 trained about rollers 20 and 21 at each end thereof. From the roller 21, the cords will pass downwardly about a vertically adjustable take-up roller, not shown, and then about a grooved roller, such grooves obtaining the proper lateral cord spacing for the return flight of the cords on the lower side of the conveyor. Such cords may also pass through a string cleaning tank 22 adjacent the roller 21. The string conveyor 18 passes through an explosion proof spray enclosure 24 with the board thereon passing between a lower spray turntable 25 and an upper spray turntable 26 for application of an adhesive coating to both sides thereof. The string conveyor 18 may be driven by a variable speed drive 27 which includes an air operated clutch and brake unit drivingly connected to the roller 21. Such variable speed drive 27 may also be employed to drive the rollers 28 of roller conveyor section 29 which forms the next conveyor section in the conveyor line 4. Individual one-way clutches may be mounted in the rollers 28 in the section 29 so that the gypsum board supported thereon may be halted even though the drive to conveyor section 29 continues. The board may then be stopped or braked for intermittent feeding to the next conveyor section in conveyor line 4.

An overhead elevator and transfer mechanism 31, similar to the unit 12, may be employed to transfer metal plates from stack 32 mounted on pallet loading table 33 adjacent the entry end 34 of the conveyor line 5. Such metal plates, which may be termed back panels, may have a thickness of 28 gauge (.0149 inch) and may vary in length from a minimum of 84 inches to a maximum of 144 inches and in width from a minimum of 24 inches to a maximum of 48 inches. The back panel plate is placed on string conveyor unit 36 by the overhead elevator and transfer mechanism 31 which comprises a plurality of nylon or like cords trained about rollers 37 and 38 at each end of the conveyor unit. A six station roll forming unit 40 is provided with three roll stands driven by a variable speed drive 41 through line shaft 42. Such line shaft projects beyond the roll stands to drive gear boxes 43 and 44, the former being connected to the roll 38 of conveyor unit 36.

The latter gear box 44 is connected to roll 45 of conveyor unit 46 which is also a string conveyor having a plurality of nylon or like cords trained about the roller 45 at the entry end and about roller 47 at the exit end. Such conveyor 46 passes through the spray enclosure 24 and beneath spray turntable 48 for application of an adhesive coating to the top of the back panel plate. A string cleaning tank 49 is provided to clean the strings of the conveyor 46 in the return flight. The string conveyor roll 47 is drivingly connected at 50 to roller 51 of roller conveyor unit 52 which may be substantially identical in form to the conveyor unit 29 of the conveyor line 4. Thus it will be seen that the variable speed drive 41 for the six station forming unit 40 also drives the conveyor units 36, 46 and 52.

An overhead elevator and transfer unit 54 similar to the units 31 and 12 is employed to transfer front panel plates from a pallet loading table 55 onto the entry end 56 of the conveyor line 6. The front panel plates are deposited by the elevator and transfer mechanism 54 on a string conveyor unit 57 which may be substantially similar to the conveyor unit 36 of line 5 and comprises nylon or like cords or strings 58 trained about rollers 59 and 60 at each end of the conveyor section.

A ten station roll forming unit 62 having five roll stands is powered by a variable speed drive unit 63 which may have a slightly higher horsepower rating than the drive unit 41 for the six station roll forming unit 40 in line 5. The forming rolls are driven from a line shaft 64, the ends of which are connected to gear boxes 65 and 66 driving the rollers 60 and 67 of string conveyor units 57 and 68, respectively. The string conveyor unit 68, which may be similar to the conveyor unit 46, passes through spray enclosure 24 and beneath a spray turntable 69 for application of an adhesive coating to the top surface of the front panel plate supported on such conveyor unit. The nylon cords or strings of the conveyor then pass about roll 70 about a take-up roll and through string cleaning tank 71 on the lower or return flight. The string conveyor roller 70 is drivingly connected to roller 73 of string conveyor unit 74 as indicated at 75 so that the variable speed drive unit 63 for the forming mill 62 not only drives the forming rolls of the mill, but also the string conveyor units 57, 68, and 74.

The conveyor units 29, 52 and 74, of the lines 4, 5 and 6, pass beneath a catwalk 75 conveying the now adhesively coated gypsum board and back and front panel plates supported on the lines 4, 5 and 6, respectively.

The front panel plates on line 6 may have a thickness of 24 gauge (.0239 inch) and like the gypsum board and back panel plates, may vary in length from a minimum of 84 inches to a maximum of 144 inches and in width from a minimum of 24 inches to a maximum of 48 inches.

The spray turntables 25, 26, 48 and 69 in the spray enclosure 24 form per se no part of the present invention and reference may be had to applicant's copending application, filed Dec. 12, 1963, Ser. No. 330,016, now abandoned, entitled "Apparatus and Method for Spraying," for a more detailed disclosure of spray turntables that may be utilized with the present invention for application of an adhesive coating to both sides of the gypsum board, and to the top surfaces of the back and front panel plates. It is desirable that the adhesive coating be non-transferable upon leaving the spray enclosure so that soft rubber accelerator rollers, hereinafter described, do not become contaminated.

Turning now momentarily to FIGS. 2 and 3, it might be well to review the operation thus far performed upon the components of the building panel by the apparatus above described and shown more particularly in FIG. 1. The elevator and transfer mechanism 12 will place the gypsum board 80 on the conveyor line 4, the elevator and transfer mechanism 31 will place the back panel or face plate 81 on the conveyor line 5, and the elevator and transfer mechanism 54 will place the front panel or facing plate 82 on the conveyor line 6. Since the leading ends or entry ends of the respective conveyor lines are offset, it will be appreciated that the gypsum panel 80 will enter the spray enclosure 24 after only a relatively short distance of travel on the conveyor line 4 whereas the back and front panel or face plates must first travel through the respective roll forming units 40 and 62 before entering the spray enclosure. The offset entry ends of the conveyor lines also facilitate the placement of pallets of panel components for loading purposes.

The gypsum panel 80 will be conveyed upon the string conveyor unit 18 into the spray enclosure 24 wherein the turntables 25 and 26 will place a coating of adhesive on the top 84 and bottom 85 of the gypsum panel. The back panel plate 81 will be caused to move by the string conveyor unit 36 into the roll forming unit 40 wherein the edges will be bent upwardly as indicated at 87, outwardly as at 88, and finally downwardly as at 89. The flanged portion 87 will be normal to the surface of the plate 81 whereas the outwardly directed flange portion 88 will be parallel to the surface of the plate. The terminal or downwardly extending flange portion 89 may be substantially normal to the planar surface of the back plate. From the roll forming unit 40, the back panel plate, thus formed, will move onto the conveyor unit 46 and through the spray enclosure 24 so that the spray turntable 48 thereabove will apply an adhesive coating to the top surface 90 thereof.

The elevator and transfer mechanism 54 places the front panel or face plate 82 on the conveyor unit 57 of the line 6 and such then moves the panel into the roll forming unit 62 which then forms each edge of the front panel plate as indicated at the left in FIG. 3. The roll forming unit 62 bends the edge of the panel plate inclined upwardly at approximately a 45° angle as indicated at 92 and then inclined upwardly and inwardly as indicated at 93, also at approximately a 45° angle. The plate edge is then bent back upon itself to extend inclined downwardly and outwardly as indicated at 94 and then downwardly and inwardly as indicated at 95. The upper bent or folded edge 96 of the plate is then approximately directly above the obtuse fold line 97 between the face of the panel plate and the upwardly inclined portion 92. The angle between the portions 92 and 93 is approximately 90° so that an isosceles right triangle formation is provided. With the edges of the front panel plate thus formed, the plate will be passed onto the conveyor unit 68 for movement through the spray enclosure 24 and beneath the spray turntable 69 for application of an adhesive coating to the top surface 99 thereof.

It is noted that the front panel plate 82 may be substantially wider than both the back panel plate 81 as well as the gypsum board 80. This not only permits the extensive forming illustrated in FIG. 3, but also facilitates the interfitting of the panel components as hereinafter described.

Referring back now to FIG. 1A and more particularly to conveyor line 6, the string conveyor 74 terminates in string roller 100 which is drivingly connected at 101 to roller 102 of conveyor unit 103. The conveyor unit 103 in line 6 is substantially identical in form to the conveyor units 29 and 52 in the lines 4 and 5 and comprises a plurality of segmented rollers each provided with one-way clutches which are drivingly interconnected by chains or the like indicated at 104. Chains 105 and 106 are provided for the conveyor units 29 and 52.

Such conveyor units 29, 52 and 103 will then move the panel components formed and coated as indicated in FIG. 3 into the pass of rubber covered accelerator roll units 108, 109 and 110 in the conveyor lines 4, 5 and 6, respectively. The one-way clutches in the individual rolls of the conveyor units 29, 52 and 103 permit the drives therefor to continue operation even though the rolls will not turn with the panel components situated thereon held against the pass of the roll units 108, 109 and 110. The purpose of these roll units is to enable the panel components to travel continuously through the spray enclosure, and then, after engaged by the accelerator roll units, to increase their speed so that openings are created between successive components. This permits line transfer units, hereinafter described, to complete their cycle.

Such accelerator roll units are drivingly interconnected with roller conveyor units 113, 114 and 115 which are driven by variable speed drives 116, 117 and 118, respectively, each of which incorporate an air clutch and brake unit. Such conveyor units 113 through 115 are similar to the conveyor units 29, 52 and 103 but do not incorporate the one-way clutches in each of the segmented rollers. All of the rollers of the units 113 through 115 are drivingly interconnected as indicated at 119, 120 and 121 and such conveyor units including the accelerator roll units at the entry ends thereof may be driven by the drives 116 through 118 intermittently to feed the respective panel components to line transfer and flip-over units shown generally at 123 and 124. Each of such units may be substantially identical in form and includes a tilting string conveyor 126 and a roll-over unit 127 cooperating therewith.

Referring now additionally to FIG. 7, it will be seen that the tilting string conveyor 126 of each unit comprises a plurality of slightly laterally spaced string conveyors, six in number in the illustrated embodiment, which are trained about rollers 130 which extend between the legs 131 and 132 of U-shape frames supported on arms 133 extending from main U-shape frame 134, the legs 135 and 136 of which as well as center post 137 are pivoted at 138. Elongated rollers 139 and 140 extend between the outer legs 135 and 136 and the intermediate post 137. The rollers 139 and 140 as well as the frame arms 135, 136 and 137 may be mounted on a pivot shaft extending between brackets 141 fixed with respect to the plant floor 2. The plurality of strings trained about each of the rollers 130 may be of four millimeter nylon string, similar to the string employed in the other string conveyors illustrated. The piston-cylinder assembly 143 may be provided near the outer ends of the tilting string conveyor 126 to cause the same to tilt to the phantom line position 144 indicated in FIG. 7. As seen in such figure, the strings 145 of each conveyor pass over the tops of rollers 130 and over the tops of elongated rollers 139 and 140 and then downwardly about the bottoms of rollers 147, one such roller 147 being provided for each of the laterally extending string conveyors, and then upwardly over the top of roller 148 and then around roller 149 for the return flight beneath such rollers 149, 148, 147, 139, 140 and finally around roller 130. The rollers 147, which the strings pass beneath, may be driven by variable speed drive units 150 which include air operated clutch and brake units for starting and stopping purposes. A common line shaft may interconnect each of the rollers 147 for each unit.

It will now be seen that each of the six conveyors incorporated in the transfer units 123 and 124 include a tiltable portion and a horizontally fixed portion. The tiltable portion which is mounted on the arms 133 extends between the rollers 152 of the conveyor units 113 and 115 and in the down position, slightly beneath the top level of such rollers. The fixed rollers 147, 148 and 149 are mounted on frame members 153 which extend at each side of the respective string conveyors in the transfer units.

Alternately arranged with respect to the fixed portions of the string conveyors are arms 155 of the roll-over unit 127. These arms may include upwardly projecting pads or suction tips which are adapted to engage the underside of a panel component positioned thereover and are mounted on elongated tubular hub 156 extending between brackets 157 and 158. Rotary hydraulic cylinders 160 may be employed to swing the assemblies and thus the arms 155 about the axis of the hub 156 to cause the arms 155 to swing through an arc indicated in phantom lines at 161 in FIG. 7 of approximately 180°. The arms may be provided with adjustable stops 162 thereon properly to position a panel component received from the tilting string conveyor unit and such stop may be employed to actuate the cylinder assembly 160 to cause the arms to swing through the illustrated arcuate pass.

It can now be seen that a gypsum panel, adhesively coated on both sides engaging the pass of the accelerator roll assembly 108, may be fed onto the conveyor unit 113 by energization of the clutch and brake portion of the drive 116. The panel will then move against retractable stops 164. Simultaneously, the back panel plate may be fed through accelerator roll unit 109 by energization of the clutch and brake drive 117 to be positioned against retractable stops 165. The piston-cylinder assemblies 143 will now be energized elevating the arms 133 supporting the tiltable ends of the string conveyors causing the gypsum panel to be lifted from the conveyor line 4 and transferred laterally onto the fixed portion of the transfer string conveyors against the stops 162. The cylinder assembly 160 may now be energized causing the arms 155 to swing through the desired arc with the suction tips on such arms securing the gypsum board thereto. The gypsum board will now be inverted and placed upon the adhesively coated top surface of the back panel plate 81 as indicated in the center of FIG. 4. The piston-cylinder assemblies 143 will now be retracted to receive the next gypsum panel fed through the rolls of the unit 108 by the drive 116. The stops 165 may now be retracted and the combined back panel plate and gypsum panel will now be fed onto conveyor unit 168 which is driven by variable speed drive 169 also having a clutch and brake unit. Each of the rollers 170 of the conveyor unit 168 may be driven through chain 171 from such drive 169. The combined back panel plate and gypsum panel will now move against retractable stops 172 in proper position to receive the front panel plate.

The front panel plate is fed to the center or conveyor line 5 from the conveyor line 6 in substantially the same manner as the gypsum board panel is fed from the conveyor line 4 to the center or conveyor line 5. The clutch and brake portion of the drive 118 is energized causing a front panel plate to be fed through the accelerator roll unit 110 onto the conveyor unit 115 against retractable stops 173 and the piston-cylinder assembly 143 of the unit 124 is now energized causing the tiltable portion of the six string conveyors to elevate lifting the front panel plate from the conveyor line 6 and causing the same to move laterally now onto the fixed portion of the transfer string conveyors against the stops 162 on the rollover assembly 127. The front panel plate is then inverted upon the actuation of the rotary hydraulic cylinder 160 to be placed on top of the gypsum panel as indicated in FIG. 5. The piston-cylinder assemblies 143 of the unit 124 will now be retracted to receive the next front panel plate in the same manner. With the front panel plate 82 now inverted and positioned on top of the gypsum board 80, which is inserted between the formed edges of the back panel plate 81, the retractable stops 172 are now removed from the path of the assembled panel and the drive unit 169 will move the panel over idler roll 175 onto conveyor unit 176.

Each of the rollers 178 of the unit 176 are interconnected by chain or other suitable drive 179 and the end roller 180 is driven from a gear box 181 connected to line shaft 182 driven from variable speed drive unit 183. The variable speed drive unit, through the line shaft 182, also serves to drive a forming roll unit 184 which includes a pinch roll unit 185 and gear box 186 driving roller 187 of string conveyor unit 189. The forming roll unit 184 includes side forming rollers 190, three on each side as indicated.

The drive 183 will then force the now assembled panel through the pressure roll unit 185 which will exert a considerable facial pressure on the front and back panel plates ensuring complete interfacial adhesive contact. The pinch roll unit 185 will also serve to force the panel through the final forming pass of the forming roll unit 184. The unit 185 may also serve to increase panel speed.

Referring now to FIGS. 4, 5 and 6, and first to FIG. 4, it will be seen that the lateral transfer and flip-over unit 123 has now placed the gypsum board panel 80 on the top surface of the back panel plate 81 between and slightly spaced from the flange portions 87 thereof. The front panel plate 82 still on the conveyor line 6 is now in position to be transferred and flipped over by the unit 124.

As seen in FIG. 5, after the unit 124 has flipped the front panel plate 82 over, it will be positioned on top of the gypsum board 80, the adhesive coated side 99 now down in contact with the adhesive coated side 85 of the gypsum board. The partially formed edges of the front panel plate 82 extend beyond flange portions 88 of the back panel plate 81 and are in contact therewith. The thus assembled panel now moves through the pressure roll unit 185 ensuring complete interfacial adhesive contact and through the final roll forming unit 184 with rollers 190 bending the inclined portions 92 of the edges of the front panel plate at the obtuse fold line 97 to a position normal to the plane of the face of the panel and with the edge 96 now underlying the edge flange 89 on the back panel plate 81. In this manner, the edges of the front and back panel plates are interlocked by the final roll forming operation and the front and back panel plates completely enclose the gypsum board 80 or insulating panel therebetween. The total thickness of the panel will then be the thickness of the gypsum board which is approximately ⅜ of an inch plus the thicknesses of the 24 and 28 gauge front and back panel plates, respectively. It will be appreciated that any burrs or minor deformations on the edges of the panel plates will not in any way interfere with the roll forming operations so that the final dimensions of the finished panel will not in any way be affected. Moreover, the finished panel does not have any lateral projections extending beyond the front and back faces thereof.

Returning now to FIG. 1A, from the string conveyor 189, the finished panel may now move onto string conveyor 193, the entry roller 194 of which is drivingly connected to the exit roller 195 of string conveyor 189. From the string conveyor 193, the panel now passes onto a string conveyor 196, which may separately be driven, which passes over slat conveyors 197 and 198 in pit 199. Stacking pallets 200 may be positioned on the slat conveyors 197 and 198 as indicated for movement into a loading position beneath an overhead elevator and transfer mechanism 201, similar to the mechanisms 12, 31 and 54, which will remove the finished panel from the string conveyor 196 which is the terminal conveyor unit of the conveyor line 5. Such overhead transfer mechanism 201 may operate simply in a reverse manner as the units 12, 31 and 54. When the proper number of panels have been placed upon the pallet, the panels will be strapped thereto under pressure and the loaded pallet then moved off the end of the slat conveyor at the top of FIG. 1A to a loading dock for transshipment to a warehouse or to the site of installation. Since there are no laterally projecting edges or portions of the panel, such panels may be stacked one on top of the other in a contiguous manner without any separating elements. Such manner of stacking and shipping will maintain interfacial pressure permitting the adhesive to set and remove surface irregularities.

Runout tables 204 and 205 may be provided on the ends of the conveyor lines 4 and 6, respectively, to receive panel components which may in some way be defective or for quality control inspections. On the runout table 205, there is indicated in outline the maximum size panel 206 and the minimum size panel 207 which may be utilized in the illustrated embodiment. It will be appreciated that the entire production line may be operated completely automatically with fork lift trucks, overhead cranes, or the like supplying the materials at the entry end of the production line and similar mechanisms removing the finished panel from the exit end. All of the various conveyor drives and the operation of the tilting string conveyors and roll-over assemblies may be sequenced for proper automatic operation. The conveyor line speed may vary from about 28 to 48 ft./min. and a completed panel may be obtained approximately every fifteen seconds.

The contact adhesive, which is applied by the turntables 25, 26, 48 and 69 to both sides of the gypsum panel and the top surfaces of the back and front panel plates, is preferably a thermosetting contact adhesive which will cure at room temperature. The adhesive should also desirably be sprayable for ease of application to the panel components although it will be appreciated that other forms of adhesive applications may be employed. It is desirable that the adhesive be nontransferable shortly after leaving the spray enclosure and heating to drive off the solvents is obviously not desired. This may be achieved through the type of adhesive used, solvent balance and the method of application at line speeds in excess of 28 ft./min. Since it should be non-transferable and bond secured upon contact, epoxies are generally not useable in this line. A rubber contact type of adhesive with good metal adhesion, tack, strength and resilience properties is desired. The neoprene type is preferred, however, other types, such as rubber, reclaimed rubber, butadiene-styrene, butyl polybutylene, buna-N or thiokol may be used. This type of adhesive must be applied to both surfaces to be bonded, dried tack free, assembled and bond secured under pressure (some types must be heat cured). If prime painted before assembly and finish enamel coating is not needed, a thermoplastic adhesive can be used. If, however, a finished baked enamel coat is required, a thermosetting type must be used. In a fire, since panel sheets are interlocked, it makes little difference which type is used. Thermoplastic or thermosetting properties can be obtained by adding the proper basic phenolic resins to neoprene adhesives. Generally, neoprene adhesives can be modified with phenolic resins modified with terpene to secure thermoplastic properties. Certain phenolic resins, based on butyl phenol, along with other additives can be used to secure thermosetting properties. Other resins can be used to secure proper age curing or heat curing properties.

It can now be seen that there is provided apparatus and a method for manufacture of building panels in which the edges of a first face plate are formed, and the edges of a second face plate are partially formed, an adhesive coating is supplied to both faces of a gypsum or other insulating material board and the inside faces of the face plates are also adhesively coated. The coated insulating board is then placed on the coated face of one of the face plates and then the other face plate is positioned with its coated face against the gypsum board, passed through pinch rollers to secure adhesive bond, and finally the edges of the second face plate are finish formed so that the edges of the face plates are interlocked and the plates completely enclose the insulating panel sandwiched therebetween. It will, of course, be understood that the complete roll forming operation may be performed after the facing plates or skins are adhesively secured to the core.

Other modes of applying the principle of the invention may be employed, change being made as regards the details described, provided the features stated in any of the following claims or the equivalent of such be employed.

I, therefore, particularly point out and distinctly claim as my invention:

1. The method of making a building panel which comprises the steps of sandwiching an insulating panel between two metallic face plates by partially roll forming the lateral edges of at least one of such face plates, then adhesively coating at least both faces of the insulating panel and at least the opposed lateral edge portions of such partially roll formed face plate, placing the insulating panel on one face plate, and then placing the other face plate against the insulating panel and then finish roll forming said lateral edges thereafter.

2. The method of forming a building panel comprising the steps of disposing a first facing plate in side-by-side substantially coplanar position between a second facing plate and an insulating panel, coating the same side of such facing plates and both sides of such insulating panel with an adhesive, inverting such insulating panel and placing the same on top of one of such facing plates, and then inverting the other facing plate and placing it on such insulating panel to form such building panel.

3. The method of making a building panel comprising the steps of partially roll forming the edges of a first face plate, adhesively coating both faces of an insulating panel, adhesively coating the inside faces of such first face plate and a second face plate, placing such thus coated insulating panel on the coated face of one of such face plates, placing the other face plate with its coated surface against such insulating panel, passing such assembled face plates and insulating panel through a pressure roll unit, and finish roll forming the edges of both such first and second face plates to interlock the edges of such faces with such insulating panel sandwiched therebetween.

4. The method of making a buliding panel comprising the steps of sandwiching an insulating panel between two metallic face plates by partially roll forming the lateral edges of at least one of such plates, then adhesively coating at least the inside faces of the face plates, placing the insulating panel on the coated face of one face plate, then placing the other face plate with its coated face against the insulating panel, and then finish roll forming said lateral edges thereafter.

5. Apparatus for forming panels for reusable wall systems comprising three parallel conveyor lines, means for placing a face plate on the center conveyor line, means for placing a face plate and gypsum board on the side conveyor lines, respectively, means for coating an adhesive on the top sides of said face plates and both sides of said gypsum board as they move along said conveyor lines, means for laterally shifting said gypsum board from its conveyor line and place it on the face plate on the center conveyor line, and means for inverting the face plate on the side conveyor line and place the same on the gypsum board on the center conveyor line to form such panel; and roll forming stands in the conveyor lines for at least one such face plate at least partially to form the edges thereof; and a spray enclosure extending transversely of said conveyor lines, spray means in said spray enclosure arranged above such face plate conveyor lines and above and below such gypsum board conveyor line.

6. Apparatus as set forth in claim 5 wherein said conveyor lines each include a string conveyor passing through said spray enclosure.

7. Apparatus as set forth in claim 6 including tilting string conveyor means longitudinally offset extending from the outside conveyor lines to the center conveyor line operative sequentially to transfer a face plate and such gypsum board to the center conveyor line for placement on a face plate thereon.

8. Apparatus as set forth in claim 7 wherein said tilting string conveyors terminate in a roll-over assembly operative to invert a face plate and such gypsum board onto the center conveyor line.

9. Apparatus as set forth in claim 8 including a pressure roll unit and a final roll forming stand in said center conveyor line to squeeze the face plates against such gypsum board, and finally roll form the edges of such face plates.

10. Apparatus as set forth in claim 9 including an elevator and the transfer mechanism at the terminal end of said center conveyor line operative to remove the finished panel therefrom and the stack the same on pallets.

11. Apparatus for forming building panels comprising three parallel conveyors, means for placing a face plate on the center conveyor, means for placing a face plate and an insulating panel on the side conveyors, respectively, means for partially roll forming the lateral edges of at least one of said face plates, means for adhesively coating the top sides of said face plates as they move along said conveyors, means for laterally shifting said insulating panel from its conveyor and placing it on the face plate on the center conveyor, means for inverting the face plate on the side conveyor and placing the same on the insulating panel on the center conveyor, and means for forming fully the lateral edges of such face plates to interlock the same and enclose such insulating panel therebetween.

12. Apparatus as set forth in claim 11 including longitudinally offset tilting conveyors extending from the side conveyors to the center conveyor to transfer a face plate and such insulating panel thereto.

13. Apparatus as set forth in claim 12 wherein said longitudinally offset conveyors terminate in roll-over assemblies operative to invert such face plate and insulating panel sequentially onto the face plate on said center conveyor.

14. Apparatus as set forth in claim 11 including a spray enclosure extending transversely of said three parallel conveyors, and spray means in said spray enclosure operative in such manner to coat both the face plates and insulating panel.

15. Apparatus as set forth in claim 11 including transverse conveyors extending from the side conveyors to the center conveyor for transferring a face plate and such insulating panel from the side conveyors to said center conveyor, and pinch roll units operative intermittently to feed such face plates and insulating panels along the three conveyors to said transverse conveyors.

16. Apparatus as set forth in claim 11 including overhead elevator and transfer mechanisms at the entry end of each conveyor operative to place such face plates and insulating panels on the respective conveyors one at a time, and an overhead elevator and transfer mechanism at the exit end of the center conveyor operative to remove the finished panels therefrom one at a time for stacking on pallets.

17. Apparatus for making building panels comprising means for supporting three building panel components side-by-side, means operative for adhesively coating the top surface of two adjacent components and both surfaces of the third, means operative for placing the third component on the middle component, and means operative for inverting the other component and place it on the middle component with the third component sandwiched therebetween.

References Cited

UNITED STATES PATENTS

| | | | |
|---|---|---|---|
| 648,632 | 5/1900 | Parker | 161—43 |
| 2,219,805 | 10/1940 | Buttress | 29—200 X |
| 2,576,698 | 11/1951 | Russum | 29—509 X |
| 2,752,672 | 7/1956 | Tolman | 29—455 |
| 3,003,902 | 10/1961 | McDuff. | |
| 3,139,369 | 6/1964 | Sullivan et al. | 156—563 |
| 3,147,166 | 9/1964 | Friday | 156—563 X |

FOREIGN PATENTS 497,334   11/1953   Canada.

CHARLIE T. MOON, *Primary Examiner.*